United States Patent [19]
Pavlicek

[11] Patent Number: 5,894,859
[45] Date of Patent: Apr. 20, 1999

[54] COMPRESSED GAS EMERGENCY SHUTOFF VALVE

[76] Inventor: Melvin W. Pavlicek, Box 275, Watonga, Okla. 73772

[21] Appl. No.: 08/966,284

[22] Filed: Nov. 7, 1997

[51] Int. Cl.⁶ .................................................. F16K 17/34
[52] U.S. Cl. .................................... 137/460; 137/614.21
[58] Field of Search ............................ 137/460, 614.21

[56] References Cited

U.S. PATENT DOCUMENTS

| | | | |
|---|---|---|---|
| 2,633,862 | 4/1953 | Dales | 137/614.21 |
| 3,159,167 | 12/1964 | Mueller et al. | 137/71 |
| 3,645,286 | 2/1972 | Follett | 137/460 X |
| 3,850,189 | 11/1974 | Follett | 137/460 X |
| 3,930,517 | 1/1976 | Gagala | 137/329.4 |
| 4,373,548 | 2/1983 | Chou | 137/460 |
| 4,762,140 | 8/1988 | Davis | 137/71 |
| 5,144,973 | 9/1992 | Green et al. | 137/71 |

*Primary Examiner*—John Fox
*Attorney, Agent, or Firm*—Robert K. Rhea

[57] ABSTRACT

A safety valve or a compressed gas cylinder is formed by a tubular assembly projecting into the access port of the cylinder and axially controlling a control valve and elongated stem axially connected with the control valve projects into the passageway formed by the tubular valve assembly to maintain a valve off seat. In the event the control valve is damaged or broken off and the stem removed the safety valve is biased closed with its seat by pressure drop across the position of the valve seat with minimal loss of gas.

5 Claims, 1 Drawing Sheet

COMPRESSED GAS EMERGENCY SHUTOFF VALVE

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to a safety valve for a compressed gas cylinder, in which an access valve is axially located at one end of the cylinder.

1. Field of the Invention

The access or control valve on a compressed gas cylinder such as an oxygen tank is in open position when in use, and if the tank inadvertently gets knocked over, the valve extending axially from the end of the tank my be deflected or broken off at the point where it joins the tank, thus creating a hazard by the high pressure gas exiting the tank.

This invention provides a valve axially connected with a compressed gas control valve and disposed in a cylinder which automatically closes in the event of an accident rupturing or breaking the outwardly projecting control valve.

2. Description of the Prior Art

U.S. Pat. No. 3,930,517 issued Jan. 6, 1976 to Gagala for Safety Valve and U.S. Pat. No. 5,144,973 issued Sep. 8, 1992 to Green et al. for Safety Valve For Compressed Gas Cylinders. Each of these patents disclose a primary valve for accessing compressed gas in a cylinder and a secondary valve located within the cylinder and axially connected with the primary valve in which the normally open secondary valve is spring biased closed to contain the gas in the event the primary valve is deflected or broken off of the cylinder.

U.S. Pat. No. 3,159,167 issued Dec. 1, 1964 to Mueller et al. for Service Tee Installation Including Excessive-Flow Safety Valve and U.S. Pat. No. 4,762,140 issued Aug. 9, 1988 to Davis for Snap-Off Plug Valve are considered good examples of the further state-of-the-art. Both of these patents disclose a tubular member for releasing fluid from a source in which the tubular member contains a normally open valve in the tubular member biased closed by fluid pressure in the source in response to rupture of the tubular member at a circumferential fracture line which would otherwise exhaust the fluid to the atmosphere.

This invention is believed distinctive over the above patents by providing a compressed gas primary control valve having an axially connected probe projecting into a compressed gas cylinder to maintain a safety valve, axially depending from the primary valve, in open position and releases the safety valve to close in the event the primary valve is ruptured or broken off of the cylinder.

SUMMARY OF THE INVENTION

A bushing having an axial bore supporting a primary access valve and forming a passageway for compressed gas to and from a cylinder, is threaded into a cylinder port. A check or safety valve depending from the bushing prevents gas loss in the event of an accident deflecting or severing a primary access valve supported by the bushing from the cylinder the check valve will prevent loss of gas through the passageway.

The principal object is to provide a safety valve disposed within a compressed gas cylinder for preventing loss of gas in the event of rupture or failure of the primary access valve.

DESCRIPTION OF THE PREFERRED EMBODIMENTS

Figures 1, 2:
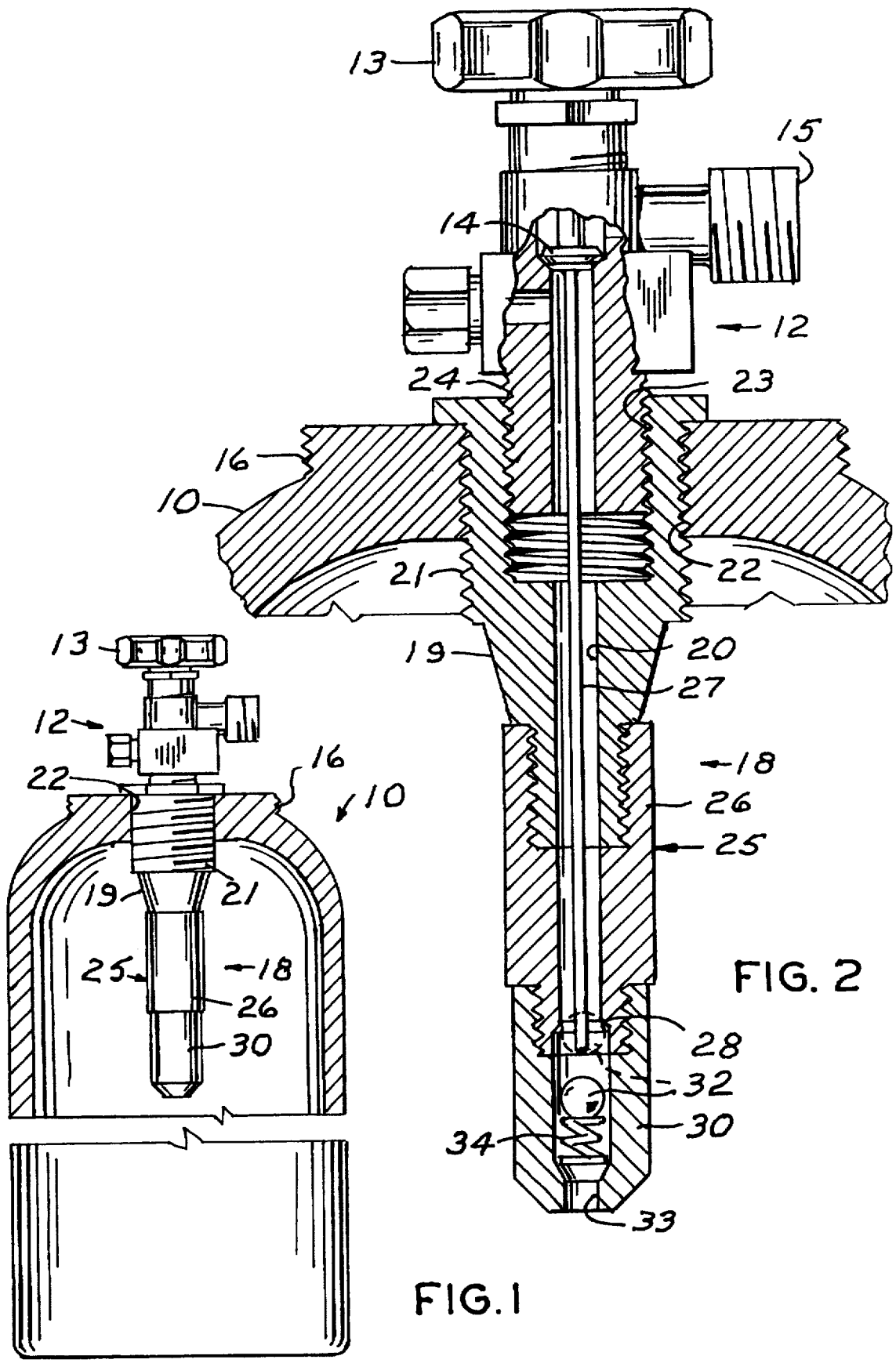
FIG. 1 is a fragmentary side elevational view, partly in section, of a compressed gas cylinder having the apparatus of the invention connected therewith; and, FIG. 2 is a fragmentary vertical cross sectional, view to a larger scale, partially in elevation.

Like characters of reference designate like parts in those figures of the drawings in which they occur.

In the drawings:

The reference numeral 10 indicates a tank or cylinder containing gas under greater than atmospheric pressure which is accessed by a conventional primary control valve 12 axially connected with one end of the cylinder 10. The control valve 12 further includes a gate wheel or operating handle 13 for opening and closing the valve 12 by seating and unseating a valve 14 for admitting gas to a lateral port 15. The cylinder 10 is normally provided with external threads 16 for receiving a bull plug type cap, not shown, which shields the control valve 12 from damage when the cylinder is not dispensing gas.

The reference numeral 18 indicates the safety valve assembly which is elongated cylindrical in general configuration, and comprises a bushing 19, centrally bored to form a passageway 20. The bushing external threads 21 engage the threads of the cylinder port 22 and its counterbore threads 23 receive the threads 24 of the control valve 12. The inward end of the bushing 19 is diametrically reduced and axially connected with a tubular housing means 25 forming a continuation of the passageway 20 including a nipple 26 having a valve seat 28, in its depending diametrically reduced externally threaded end.

The housing means 25 further includes a tubular valve cage 30, having a reduced diameter bore 33 in its depending end portion for containing a ball valve 32, axially connected with the nipple 26 for sealing with the valve seat 28, as presently explained. A support means such as a helical spring 34 supports the ball valve 32 in axial spaced relation with respect to the valve cage reduced bore 33 to permit filling the cylinder.

An elongated slender stem 27, diametrically substantially smaller than the bore of the passageway 20, is axially connected at one end with the valve 14 and moved longitudinally in the passageway 20 when opening and closing the control valve 12. The purpose of the stem 27 is to contact the ball 32 and move it out of contact with the valve seat 28 so that gas may flow out of the cylinder through the outlet port 15 when the control valve 12 is open.

OPERATION

As explained hereinabove during normal operation the stem 27 maintains the ball valve 32 unseated when the control valve 12 is open or closed. In the event the control valve 12 is broken off of the cylinder 10 and the stem 27 is separated from contact with the ball valve 32 a sudden pressure drop across the position of the valve seat 28 forces the ball valve to seal with the valve seat with minimal loss of gas. Thereafter that portion of the control valve remaining in the bushing 18, commonly called a "dutchman" in the plumbing trade, can be removed, as by an EASYOUT a left hand threaded shaft, and a replacement control valve including a new stem, neither being shown, installed in the bushing.

Obviously the invention is susceptible to changes or alterations without defeating its practicability. Therefore, I do not wish to be confined to the preferred embodiment shown in the drawing and described herein.

I claim:

1. A safety check valve for a compressed gas cylinder having an access port to close the access port when a primary control valve in the access port of said cylinder is ruptured or broken off, said safety valve depending into the cylinder from the access port, comprising:

bushing means supporting the primary valve in the access port and depending into the cylinder for forming a gas passageway through the access port;

tubular housing means axially connected with said bushing means;

a ball valve seat in said housing means;

a ball valve in said housing means for sealing with said seat and closing the passageway; and, a stem axially secured to the primary valve and projecting into said housing means for normally maintaining said ball valve off of said valve seat, whereby a damaged primary valve may be replaced without exhausting the cylinder.

2. The safety valve according to claim 1 and further including:

support means in said housing means for supporting said ball valve in spaced relation with respect to the valve seat and the depending end of said housing means.

3. A safety check valve for a compressed gas cylinder having an access port to close the access port when a primary control valve in the access port of said cylinder is ruptured or broken off, said safety valve depending into the cylinder from the access port, comprising:

bushing means supporting the primary valve in the access port and depending into the cylinder for forming a gas passageway through the access port;

tubular housing means depending from said bushing means to form a continuation of the passageway;

valve and valve seat means in said housing means for opening and closing the passageway; and, a stem axially secured to the primary valve and projecting into said housing means for normally maintaining said ball valve off of said valve seat, whereby a damaged primary valve may be replaced without exhausting the cylinder.

4. The safety valve according to claim 3 in which the housing means includes:

a nipple depending from said bushing means and having a valve seat at its depending end;

an axially bored and counterbored valve cage depending from said nipple; and, a ball valve in said valve cage.

5. The safety valve according to claim 4 and further including:

support means in said valve cage for supporting said ball valve in spaced relation with respect to the valve seat and the depending end of said valve cage.

* * * * *